June 7, 1932.  C. L. HEISLER  1,862,364

FILM GATE FOR MOTION PICTURE MACHINES

Filed March 27, 1929

Inventor
Charles L. Heisler,
by
His Attorney.

Patented June 7, 1932

1,862,364

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

FILM GATE FOR MOTION PICTURE MACHINES

Application filed March 27, 1929. Serial No. 350,403.

My invention relates to motion picture machines and particularly to that part of a motion picture machine known as the film gate. One object of my invention is the provision of an improved gate construction for a motion picture machine which will pass spliced films with minimum vibration or shock and which is simple, efficient and inexpensive to manufacture. Another object of my invention is the provision of an improved gate whose construction prevents any fluttering at the projection aperture of the central portion of a film which has become distorted or deformed.

My invention will be better understood from the following description taken in connection with the accompanying drawing, and its scope will be pointed out in the appended claims.

Figure 1:
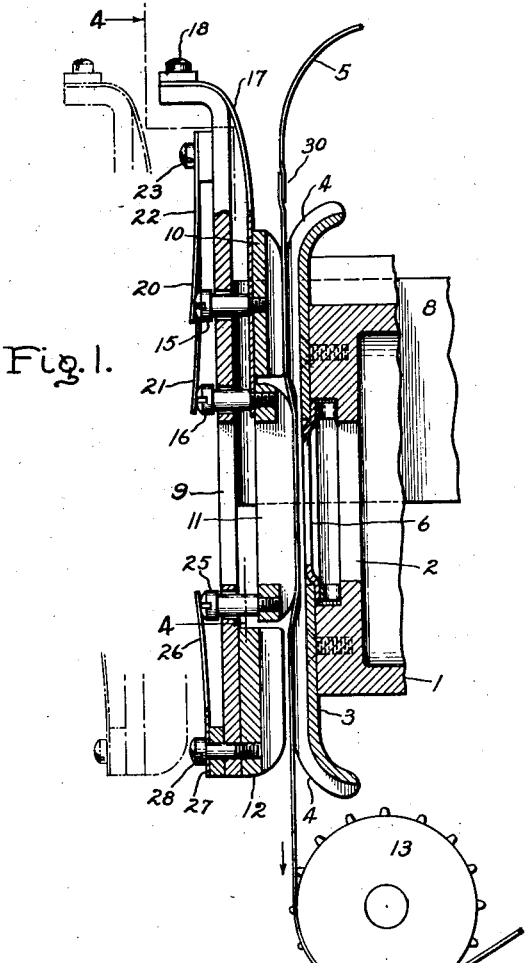
Figure 2:
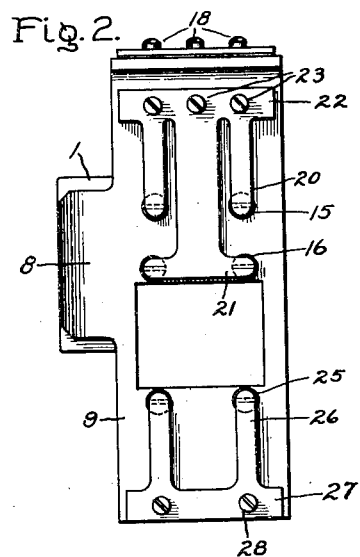
Figure 3:
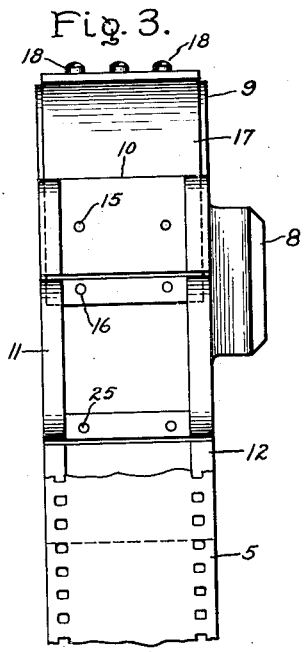
Figure 4:
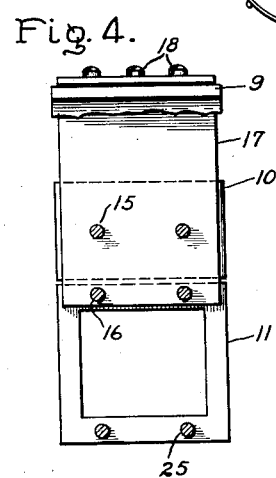

Referring to the drawing, Fig. 1 is a side view in partial cross section of a film gate embodying my invention; Fig. 2 is a view on a reduced scale of the gate as viewed from the left of Fig. 1; Fig. 3 is a view also on a reduced scale looking from the right of Fig. 1 on that portion of the gate situated on the left of the film; and Fig. 4 is a sectional view on a reduced scale taken on the line 4—4 of Fig. 1.

Inasmuch as my present invention relates only to the film gate of a motion picture machine, I have limited the drawing to the gate construction and to that portion of the rest of the machine from which the gate is supported. To the machine frame 1 having the projection opening 2 is secured to the aperture plate 3 on the outer face of which are the runners 4 in engagement with film 5. These runners are spaced to engage the edge portions only of the film or those portions which are adjacent the sprocket holes and at each end are shown curved back from the film. Those portions of the runners which lie opposite the opening 2 and the aperture in the aperture plate are slightly reduced in height for a purpose which will be described later. Fitting in a recess between the aperture plate and the frame is the usual mask 6. Slidably mounted in the frame 1 is the slide arm 8 forming a part of the shoe supporting member 9. Suitable means, not shown, which are old in the art are provided for holding the member 9 and its slide 8 in the closed gate position illustrated. Attached to the member 9 are the two resiliently mounted runner members 10 and 11 and the fixed runner member 12, the latter being spaced from runner 4 just sufficient to pass a splice when the gate is closed. Runner member 12 cooperates with runner 4 to guide the film toward the intermittent sprocket 13. Runner members 10, 11 and 12 each have a pair of runners thereon spaced laterally so as to engage the marginal portions of the film opposite runners 4. By means of the screws 15 and 16 runner members 10 and 11 are secured to the thin flexible strip 17, such for example as spring steel, the upper end of which is shown turned away from the film and attached by screws 18 to the upper end of the support 9. Runner securing screws 15 and 16 pass through suitable openings in the supporting member 9 and bearing against their heads are the free end portions 20 and 21 of the spring 22 secured to the member 9 by the screws 23. At the lower end of runner member 11 there is secured a similar screw 25 which also passes through member 9 and against whose head bear the two prongs 26 of the spring 27. The same screws 28 attach both the runner member 12 and the spring 27 to the member 9. Ample clearance is provided where the screws 15, 16 and 25 pass through the member 9 so as to avoid any binding since the springs which bear on the screw heads are constructed to produce the proper pressure of the runners against the film when the parts work freely. The several screws 15, 16 and 25 it will be noted tap into the runner members at one side of the runners of each thus avoiding any possibility of the film becoming scratched by the projecting end of a screw or by a burr surrounding the screw hole.

By thus constructing the shoe of a thin flexible strip after the fashion of a toboggan and attaching thereto the film engaging runners I obtain a flexibility and smoothness of operation not hitherto attainable. A splice in the film, shown for example at 30, upon reaching the gate enters the converging opening between the opposed runners slightly rocking the member 10. As the splice approaches the lower end of the member 10 the next runner member 11 is rocked by the connecting strip 17 so that this member 11 is prepared to receive the splice in front of the projection aperture with little or no shock. If desired the strip 17 may be extended so as to connect with runner member 12 whereby runner members 11 and 12 will be connected together by the strip in the same manner as runner members 10 and 11.

Runner member 11, which it will be noted lies over the projection aperture and is shown as having a hollow rectangular form, has runners which are higher than the runners of the adjacent member 10 to the same extent that the central portion of the runners 4 are reduced in height. Where the film first engages the runner member 11 and again where it leaves it the film is given a reverse bend or slight kink, the purpose of which will now be described.

Projectionists and others familiar with motion picture films know that films are occasionally found which are distorted or deformed in such a manner that the film appears to be somewhat shorter in length at the edge portions than in the central portion. When a length of several inches or a foot of such a film is held taut and viewed edgewise the central portion of the film is seen to bulge alternately on opposite sides of the straight edge portions. The film gives the impression of having become shrunken at the edges. As such a film is passed through the usual projector gate one may observe a fluttering of the body or central portion of the film as the alternate bulges thereof pass the projection aperture. This variation in position of the part of the film bearing the pictures relative to the focal plane of the objective results in a less distinct image on the screen than if the film remained perfectly flat. I have found that by giving to the film a sudden bend or kink as it approaches the aperture in the aperture plate the aforementioned bulge appears only on one side of the film and remains on that side while the pictures are being projected. Each successive picture on the film therefore stands in the same focal position during its projection which permits of sharper focusing than would otherwise be the case.

On the drawing I have shown the runners constructed to give the film a bend or kink as or immediately after it leaves the projection aperture as well as where it enters the same. Under certain conditions a kink at the latter point may be sufficient, however I prefer to kink the film in the same direction at both points. A slight offsetting only of the film is necessary to give the desired bend or kink, for example one sixteenth of an inch or even as little as one thirty second of an inch in the case of many films is sufficient usually to effect the desired result. The runners at the offset portions have rounded edges and are otherwise shaped to prevent damage to the film. With the shoe construction which I have disclosed, the yielding runners 10 and 11 are free to move at right angles to the film, the springs 22 and 27 providing the proper pressure on the film, and while the runners are supported with the outmost freedom by the strip 17 they are prevented by the same strip from having any longitudinal movement. Whenever the supporting member 9 is shifted rearwardly, for example, to the dotted line position in Fig. 1, to open the gate for inspection or for cleaning the runners, the heads of the screws 15, 16 and 25 by engaging member 9 limit the movement of the runners under the effect of the springs. Under certain conditions those portions or fingers 20 of spring 22 may be omitted and dependence had on the spring strip 17 for producing the right amount of pressure of the runner member 10 on the film. In order to avoid confusion, I have purposely omitted from the drawing the showing of certain common and well known features of gate construction which I employ in the complete structure. For example, I have not shown any centering or positioning guides such as are usually provided to engage the edges of the film, nor have I shown any means for opening or closing the gate or for securing it in closed position.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is,—

1. In a motion picture machine, a film gate comprising an aperture plate having guide runners thereon, a movable supporting member, a flexible strip secured at one end to said member, a plurality of longitudinally alined runners adapted to press a film against the guide runners of said plate and means connecting the longitudinally alined runners with said strip, the runners engaging the strip at their adjacent ends whereby the raising of one runner by the passage thereunder of a splice in the film initiates the raising of the runner next following.

2. In a motion picture machine, an aperture plate having film guide runners thereon arranged in sections, the section opposite the aperture in said plate being offset at right angles to the plate with respect to the adjoining section, and a shoe having resiliently mounted runners comprising relatively offset sections arranged to cooperate with the respective sections of said guide runners to cause the film to be given a slight kink in passing from one section to the next.

In witness whereof I have hereunto set my hand this 26th day of March, 1929.

CHARLES L. HEISLER.